Oct. 30, 1956      S. PIRILLO      2,769,117

OZONE PRODUCING DEVICE

Filed July 1, 1952

INVENTOR,
Santo Pirillo
BY
ATTORNEY

United States Patent Office 2,769,117
Patented Oct. 30, 1956

2,769,117

OZONE PRODUCING DEVICE

Santo Pirillo, Buenos Aires, Argentina

Application July 1, 1952, Serial No. 296,651

7 Claims. (Cl. 315—99)

The present invention relates to the production of ozone both on a commercial scale and in minor quantities for immediate utilization, as, for instance, in deodorizing the atmosphere of a dwelling room, assembly hall or the like.

That ozone is at the present time, and has been for some years, in considerable demand for a large number of purposes, is so well known as to need no emphasis. The demand is, however, so insistent that recourse has been had to devices of somewhat complicated construction and a relatively poor yield of about 1 to 2 liters per twenty-four hours. Moreover, the known devices in general, operate at high temperatures and therefore require the incorporation of cooling devices.

I have now discovered that by combining with a gaseous discharge lamp tube, preferably of the fluorescent type, an external sleeve of metallic mesh, and suitable circuit connections, it is possible to provide a very simple and cheap ozone producing device of relatively high yield, such as up to six liters in twenty-four hours, which requires no added or artificial cooling, and can be used for industrial applications such as in cold storage chambers, for wood seasoning, manufacture of ice chips from seawater and preservation of perishable foodstuffs such as fish; and also for more sporadic applications such as deodorizing the atmosphere of confined, habitable spaces, either with or without simultaneous illumination of such spaces.

It is therefore a principal object of the present invention to provide a novel ozone producing device of simple and cheap construction, which shall give a high yield of ozone.

A further object is to provide an ozone producing device which shall be self cooling and shall be capable of giving relatively high yields of ozone at small energy consumption.

Another object is to provide an ozone producing device adapted to be fitted directly for support and circuit control into standard lamp holders for tubular lamps of the gaseous discharge type and shall be capable of being operated to provide ozone and illumination simultaneously.

These and other objects and advantages of the present invention will become more particularly apparent in the course of the following detailed description of the accompanying drawings which illustrate, by way of example, certain preferred embodiments thereof.

Figure 1:
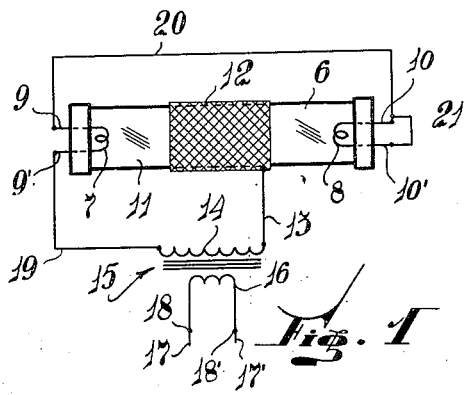
Fig. 1 is a circuit diagram illustrating the present invention embodied in combination with a hot electrode gaseous discharge tube, for the production of ozone alone.

Referring to the drawings, Fig. 1 shows a gaseous discharge tubular lamp 6 having opposed hot electrodes 7 and 8, with each of which are electrically associated pairs of contact terminals 9, 9' and 10, 10', external to the envelope 11 of the lamp. The envelope 11 may be uncoated, but I prefer to use lamps having envelopes internally coated with fluorescent material, such lamps being well known and readily obtainable.

According to the present invention, a gaseous discharge tubular lamp such as the lamp 6, is converted into an ozone producing device by providing on the outside of the envelope 11 a sleeve 12 consisting of a mesh of electro-conductive material, for example a mesh of metallic wire, and connecting said sleeve, as by a conductor 13, to one end of the secondary 14 of a step up transformer 15 having a primary 16 adapted to be connected to a power supply line 17, 17', to which end input terminal means 18, 18' are provided.

Furthermore, suitable circuit connections are provided for applying operating potentials to the electrodes 7 and 8, but as will hereinafter appear, said circuit connections will range in details according to whether a hot electrode lamp or a cold electrode lamp is used and according to whether production of ozone only or production of light and ozone simultaneously is desired.

Fig. 1 shows the circuit connections for use with a hot electrode tube when it is desired to produce only ozone. As shown, one terminal, say the contact terminal 9' of the electrode 7, is connected by conductor 19 the other end of secondary 14, while the other contact terminal 9 of the same pair, is connected by conductor 20 to the corresponding contact terminal 10 of electrode 8 which contact terminal 10 is connected to the complementary contact terminal 10' by conductor 21.

With the parts arranged as illustrated when the input terminals 18, 18' are connected to the power supply line 17, 17', energizing potential is applied from secondary 14 to the electrode 7 and also to the sleeve 12, whereby inside the envelope 11 a non luminous discharge column is formed between electrodes 7 and 8 which column acts as if it were one plate of a condenser of which sleeve 12 is the other plate and the glass envelope 11 is the solid dielectric. The slow discharge of the sleeve 12 to the immediately surrounding air causes conversion of the atmosphere oxygen into ozone.

Figure 2:
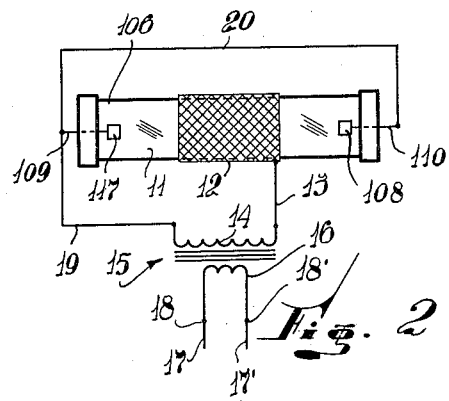
Fig. 2 is a circuit diagram similar to that of Fig. 1 for the case of a cold electrode tube.

In Fig. 2 I have shown a similar arrangement involving however a cold electrode tubular lamp 106 having electrodes 107 and 108 each with a respective contact terminal 109, 110 respectively. The connection scheme and operation of this arrangement is substantially as for that of Fig. 1.

Figure 3:
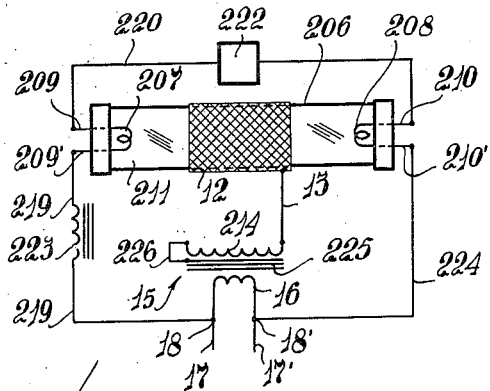
Fig. 3 is a circuit diagram involving a hot electrode gaseous discharge tube arranged according to the invention for the simultaneous production of light and ozone.
Figure 4:
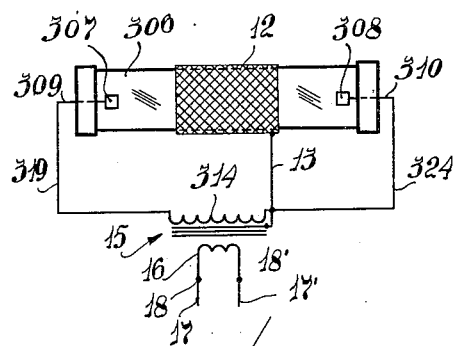
Fig. 4 is a circuit diagram similar to that of Fig. 3 showing the use of a cold electrode tube.
Figure 5:
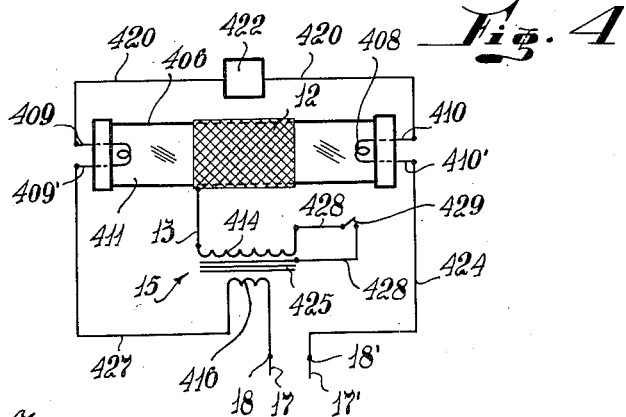
Fig. 5 is a circuit diagram illustrating a modification of the arrangement of Fig. 3 and means for selective by causing the production of light alone and of light and ozone simultaneously.

Figs. 3, 4 and 5 show devices and circuit arrangements according to the present invention for providing illumination and ozone simultaneously.

The arrangement shown in Fig. 3 incorporates a tubular lamp 206 of the type having hot electrodes 207 and 208 corresponding contact terminals 209, 210 of which are connected together by a conductor 220 including a conventional starter device indicated diagrammatically by rectangle 222. Since the lamp is in this instance intended for illumination as well, the envelope 211 will be of light pervious, that is transparent or translucent dielectric material.

The other contact terminal 209' of electrode 207 is connected by conductor 219 including a choke 223 to one of the input terminals 218, 218' to which the primary 16 of transformer 15 is also connected as shown. The other contact terminal 210' of electrode 208 is connected by a conductor 224 to the other input terminal 218'. In this arrangement the secondary 214 of transformer 15 has the end remote from the sleeve connection 13, grounded to the transformer core 225 as by conductor 226.

In Fig. 4, the connections are modified by the use of a tubular lamp 306 of the type having a light pervious envelope 311 of dielectric material including cold electrodes 307 and 308 the contact terminals 309 and 310 of which are connected by conductor 319 and 324 respectively to the ends of secondary 314 of transformer 15 the primary 16 of which is connected to line as in the hereinabove described manner.

In either of the embodiments shown in Figs. 3 and 4, effective connection of the input terminals 18, 18' to the power supply line 17, 17' causes operation of the tube 206 or 306 in well known manner to give illumination. Simultaneously owing to the condenser effect provided by the presence of sleeve 12, ozone is generated by the slow discharge as hereinabove pointed out.

If desired, a switch, not shown in Fig. 3 or 4, may be provided in conductor 13, so that the ozone production may be cut out when not required, without thereby affecting the illumination. Conductor 13 is chosen because it is grounded to the core of the transformer and therefore does not need a high voltage for switch effecting the connection and disconnection.

This idea is illustrated in Fig. 5 which likewise shows a modified circuit arrangement whereby the primary 416 of transformer 15 may be simultaneously used as a choke for the lamp circuit of lamp 406 in place of the conventional choke such as choke 223 shown in Fig. 3. The lamp 406 will, of course, comprise a light pervious envelope 411.

In the modified circuit arrangement of Fig. 5, the contact terminals 409 and 410 of hot electrodes 407, 408 are connected together in conventional manner by conductor 420 including a starter device 422. The other contact terminal 410' of electrode 408 is connected by conductor 424 to input terminal 18' but the other contact terminal 409' of electrode 407 is connected by conductor 427 to one end of primary 416 the other end of which is connected to the other input terminal 18.

One end of secondary 414 is connected, as in the other figures to sleeve 12, by conductor 13 but the other end is connected by a conductor 428 including switching means 429, to the core 425 of the transformer, whereby it is possible, as indicated above, to cut out the production of ozone and to cause ozone to be produced simultaneously with illumination, as desired.

Although I have described hereinabove the present invention with particular reference to certain preferred embodiments thereof, it is to be understood that I do not intend to be limited thereby but that I may make all such changes and modifications therein as be within the scope of the appended claims.

I claim:

1. A gaseous discharge device adapted for the simultaneous production of fluorescent light and ozone comprising an elongated gaseous discharge tube of the fluorescent type including a light-pervious envelope of solid dielectric material, a pair of hot electrodes located at respective opposite ends of said envelope, a sleeve consisting of a mesh of electrically conductive material surrounding a portion of said envelope between said electrodes, step up transformer means including a primary winding and a secondary winding, one end of said secondary winding being electrically connected to said sleeve, and at least one of said electrodes being connected to said primary winding.

2. A gaseous discharge device as recited in claim 1 in which said envelope is coated internally with fluorescent material.

3. A gaseous discharge device as recited in claim 1 in which said electrodes are electrically interconnected.

4. A gaseous discharge device as recited in claim 1 in which said electrical interconnection between said electrodes includes a lamp starter device.

5. A gaseous discharge device as recited in claim 1 in which each of said electrodes are connected to opposite ends of said primary winding.

6. A gaseous discharge device as recited in claim 1 in which said transformer includes a core and said secondary winding is electrically connected to said core.

7. A gaseous discharge device as recited in claim 6 in which said electrical connection to said core includes a switch.

References Cited in the file of this patent

UNITED STATES PATENTS

| | | |
|---|---|---|
| 1,793,799 | Hartman | Feb. 24, 1931 |
| 1,965,187 | Hartman | July 3, 1934 |
| 1,984,428 | Pirani | Dec. 8, 1934 |
| 2,252,638 | McCauley | Aug. 12, 1941 |
| 2,654,042 | Clarke et al. | Sept. 19, 1953 |